US012444909B2

(12) United States Patent
Vonau et al.

(10) Patent No.: US 12,444,909 B2
(45) Date of Patent: Oct. 14, 2025

(54) SPARK PLUG

(71) Applicant: Robert Bosch GmbH, Stuttgart (DE)

(72) Inventors: Corinna Vonau, Stuttgart (DE); Sergej Subkow, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/701,326

(22) PCT Filed: Nov. 16, 2022

(86) PCT No.: PCT/EP2022/082157
§ 371 (c)(1),
(2) Date: Apr. 15, 2024

(87) PCT Pub. No.: WO2023/094243
PCT Pub. Date: Jun. 1, 2023

(65) Prior Publication Data

US 2024/0421565 A1 Dec. 19, 2024

(30) Foreign Application Priority Data

Nov. 24, 2021 (DE) ..................... 10 2021 213 239.1

(51) Int. Cl.
*H01T 13/32* (2006.01)
*H01T 13/46* (2006.01)

(52) U.S. Cl.
CPC ........... *H01T 13/32* (2013.01); *H01T 13/467* (2013.01)

(58) Field of Classification Search
CPC .............................. H01T 13/467; H01T 13/32
(Continued)

(56) References Cited

U.S. PATENT DOCUMENTS

| | | | | |
|---|---|---|---|---|
| 11,757,262 B1 * | 9/2023 | Lykowski | H01T 13/32 313/141 |
| 2006/0181185 A1 * | 8/2006 | Yamanaka | H01T 13/32 313/144 |

(Continued)

FOREIGN PATENT DOCUMENTS

| | | |
|---|---|---|
| DE | 102004050291 A1 | 6/2006 |
| DE | 102006000070 A1 | 9/2006 |

(Continued)

OTHER PUBLICATIONS

International Search Report for PCT/EP2022/082157, Issued Feb. 17, 2023.

*Primary Examiner* — Christopher M Raabe
(74) *Attorney, Agent, or Firm* — NORTON ROSE FULBRIGHT US LLP

(57) ABSTRACT

A spark plug having a longitudinal axis. The spark plug includes: a housing; an insulator disposed at least partly inside the housing; a center electrode disposed at least partly inside the insulator and has an electrode body and an ignition element that is disposed on the combustion chamber-side end of the electrode body and serves as an ignition surface, wherein the ignition element has a cylindrical shape with a round base and a longitudinal axis which extends parallel to the spark plug longitudinal axis; and at least one ground electrode having an ignition surface disposed inside the housing on the housing. The ground electrode and the center electrode are disposed such that they form a spark gap that extends radially with respect to the spark plug longitudinal axis, wherein a width of the spark gap is not greater than 0.3 mm. The spark gaps are completely inside the housing.

10 Claims, 3 Drawing Sheets

(58) Field of Classification Search
USPC .......................................................... 313/141
See application file for complete search history.

(56) References Cited

U.S. PATENT DOCUMENTS

| | | | | |
|---|---|---|---|---|
| 2012/0299459 | A1 | 11/2012 | Sakakura | |
| 2013/0099653 | A1 * | 4/2013 | Ernst ....................... | H01T 13/32 313/140 |
| 2013/0206101 | A1 * | 8/2013 | Douglas .................. | H01T 13/32 123/260 |
| 2013/0206122 | A1 | 8/2013 | Chiera | |
| 2018/0294626 | A1 * | 10/2018 | Niessner ............. | F02B 19/1004 |

FOREIGN PATENT DOCUMENTS

| | | | |
|---|---|---|---|
| DE | 102019122976 | A1 | 2/2020 |
| EP | 2525452 | A1 | 11/2012 |
| WO | 2012113001 | A1 | 8/2012 |

* cited by examiner

SPARK PLUG

FIELD

The present invention relates to a spark plug. The spark plug according to the present invention is in particular suitable for use in a hydrogen-powered engine.

BACKGROUND INFORMATION

To date, most vehicles, such as cars or trucks, have been powered by a combustion engine that uses gasoline or diesel as fuel. Now the number of mobile and stationary combustion engines that use natural gas or hydrogen as fuel is increasing. As with a gasoline-powered combustion engine, the air/fuel mixture in the hydrogen-powered combustion engine also has to be externally ignited. Typically, a spark plug is used for this purpose.

SUMMARY

Usually a very lean air/fuel mixture (lambda>1.8) is set in hydrogen-powered combustion engines, in order to comply with regulatory emission requirements. Together with the low mixture heating value of hydrogen, this results in higher charge densities and correspondingly also higher pressures at the time of ignition. The demands on the robustness of the spark plug electrodes are increasing accordingly. Another special feature of hydrogen combustion in a combustion engine is the low ignition energy required for ignition.

The existing spark plugs are typically optimized for operation in a gasoline-powered combustion engine and are consequently not suitable for use or provide poor performance when used in hydrogen-powered combustion engines.

An object of the present invention is therefore to provide a spark plug that meets the requirements for a spark plug when used in a hydrogen-powered combustion engine and comprises electrodes having a high robustness.

This object may be achieved by the spark plug according to the present invention. The spark plug according to an example embodiment of the present invention having a longitudinal axis comprises a housing with an end face on the combustion chamber side and an insulator disposed at least partly inside the housing as well as a center electrode disposed at least partly in the insulator. The center electrode comprises an electrode body and an ignition element which is disposed at the combustion chamber-side end of the electrode body and serves as the ignition surface. The ignition element has a cylindrical shape with a round base and a longitudinal axis aligned parallel to the spark plug longitudinal axis. The spark plug also comprises at least one ground electrode which is disposed inside the housing on the housing, wherein the at least one ground electrode and the center electrode are disposed such that the at least one ground electrode and the center electrode form a spark gap that extends radially with respect to the spark plug longitudinal axis. A width of the spark gap results from an electrode spacing between the center electrode and the at least one ground electrode, wherein the electrode spacing between the center electrode and the at least one ground electrode is not greater than 0.3 mm, and the spark gaps are completely inside the housing. The projection of the ignition surface of the at least one ground electrode furthermore fits completely onto the ignition element of the center electrode in axial direction. In other words, the projection of the center electrode ignition element completely covers the ground electrode ignition surface in axial direction.

According to an example embodiment of the present invention, it is provided that the spark gap has an electrode spacing of not greater than 0.3 mm. This has the advantage that less voltage is needed for ignition and the increase in the electrode spacing over the operating time of the spark plug is smaller. Since the installation space inside the housing is inherently limited, the small electrode spacing advantageously also makes it possible to dispose the electrodes, and thus also the spark gap, inside the housing. This results in the advantage that the electrodes do not project into the combustion chamber as much and therefore absorb less heat from the combustion chamber, as a result of which wear on the electrodes is reduced.

Overlapping the ground electrode ignition surface with the projection of the center electrode ignition element in axial direction has the advantage that the ignition surface of the ground electrode is used and worn evenly in axial direction. This reduces the local temperature increases and the associated wear on the electrodes. The robustness of the electrodes, and their service life, increases accordingly.

The use of a cylindrical ignition element with a round base for the center electrode has the advantage that local electrical field increases at edges are avoided, as a result of which excessive wear at the edges as well as local melting and the formation of melt beads on the electrode ignition surfaces are prevented. The robustness and the service life of the electrodes consequently increase.

The combination of the features according to the present invention is therefore particularly advantageous because they complement and enhance one another in terms of their technical advantages.

Further advantageous embodiments of the present invention are disclosed herein.

In an advantageous further development of the present invention, it is provided that the end of the projection of the ignition surface of the at least one ground electrode facing away from the combustion chamber on the ignition element of the center electrode is spaced apart in axial direction from the end of the ignition element of the center electrode facing away from the combustion chamber, in particular that the spacing is at least 5% and in particular at most 50% of the length of the ignition element. The length of the center electrode ignition element is measured parallel to the longitudinal axis of the spark plug. For example, the end of the center electrode ignition element facing away from the combustion chamber is the end of the ignition element with which the ignition element is disposed on the electrode body of the center electrode, in particular connected in a material-locking manner. A region between the ignition element and the electrode body of the center electrode, which results from the material-locking connection, is not part of the ignition element.

The spacing between the end of the ground electrode ignition surface projection facing away from the combustion chamber on the center electrode ignition element and the end of the center electrode ignition element facing away from the combustion chamber has the advantage that it prevents sparking of a boundary surface between the ignition element and the electrode body of the center electrodes or the region between the ignition element and the electrode body resulting from a material-locking connection. This is important because the electrode body and the region between the ignition element and the electrode body of the center electrode resulting from the material-locking connection are typically made of a less robust material than the ignition element and therefore wear much faster than the ignition element when exposed to sparking. Sparking of the electrode body and the region between the ignition element and the electrode body resulting from the material-locking connection is reliably prevented if a spacing of at least 5% of the total length of the ignition element is maintained. Limiting the spacing to at most 50% prevents the ignition element from being too long. This would be disadvantageous, for example, if the ignition element is made of an expensive material.

In another advantageous further development of the present invention, it has proven to be advantageous that the projection of the ignition surface of the at least one ground electrode fits completely onto the ignition element of the center electrode in a direction perpendicular to the spark plug longitudinal axis. In other words, the projection of the center electrode ignition element completely covers the ignition surface of the ground electrode in the direction perpendicular to the longitudinal axis of the spark plug as well.

Overlapping the ground electrode ignition surface with the projection of the center electrode ignition element in a direction perpendicular to the spark plug longitudinal axis has the advantage that the ignition surface of the ground electrode is used and worn evenly also in the direction perpendicular to the longitudinal axis of the spark plug. This reduces the local temperature increases and the associated wear on the electrodes. The robustness of the electrodes, and their service life, increases accordingly.

In one embodiment of the spark plug according to the present invention, it is provided that the ignition surface of the at least one ground electrode facing the center electrode is a flat surface. This has the advantage that the electrodes are easy to manufacture and easy to align with one another.

In another embodiment of the spark plug according to the present invention, it is provided that the ignition surface of the at least one ground electrode facing the center electrode is concave, in particular has a contour which is shaped complementarily to the center electrode ignition element, in particular with rounded edges. The center electrode and the at least one ground electrode thus advantageously have a very uniform electrode spacing relative to one another in the direction axial and perpendicular to the longitudinal axis of the spark plug, as a result of which the electrodes are worn very evenly over their entire ignition surfaces. This corresponds to an increase in electrode robustness, and accordingly spark plug service life.

According to an example embodiment of the present invention, the electrode spacing is advantageously not greater than 0.2 mm, for instance, in particular not greater than 0.15 mm. The smaller the electrode spacing, the lower the voltage required to generate an ignition spark.

According to an example embodiment of the present invention, it is also advantageous if the electrode spacing is at least 0.05 mm, in particular not less than 0.1 mm. The electrode spacing is therefore not too small. A very small electrode spacing poses particular challenges in terms of accuracy in spark plug production. A deviation from the ideally parallel alignment of the electrode ignition surfaces has a greater effect with a small electrode spacing, for example uneven wear on the ignition surface, than with a larger electrode spacing. The lower limit for the electrode spacing is therefore a good compromise between a small electrode spacing to reduce the ignition voltage requirement and wear, on the one hand, and, on the other hand, a justifiable amount of effort for a consistently good quality of the alignment of the ignition surfaces to one another during spark plug production.

In a further advantageous embodiment of the spark plug according to the present invention, the spacing between the spark gap and the combustion chamber-side end face of the housing is at least 0 mm and at most −15 mm, in particular not less than −1 mm and/or not greater than −4 mm. A plane subtended by the combustion chamber-side end face of the housing perpendicular to the longitudinal axis of the spark plug is a reference plane with the value 0 mm. The spacing from the reference plane takes on an increasingly negative value in the direction of the end of the spark plug facing away from the combustion chamber and an increasingly positive value in the direction of the combustion chamber.

The spark gap is the volume between the ground electrode and the center electrode that results between the overlapping projections of the oppositely disposed ignition surfaces of the electrodes onto one another. In other words, the ignition surface of the center electrode is projected onto the ignition surface of the ground electrode and vice versa. The volume covered by the two projections is the volume of the spark gap. The volume is delimited in one dimension by the ignition surfaces and in the other dimensions bounded by the projected overlap of the ignition surfaces onto one another. The spacing is measured from the combustion chamber-side end of the spark gap to the combustion chamber-side end face of the housing.

The feature that the spacing between the spark gap and the combustion chamber-side end face of the housing is at least 0 mm means that the spark gap is disposed completely inside the housing, i.e., the spark plug has a neutral or negative spark position. This has the advantage that the electrodes are pulled as far as possible out of the combustion chamber and therefore absorb as little heat as possible from the combustion processes taking place in the combustion chamber. This reduces wear on the electrodes.

An advantageous measure to ensure that the spark plug is as cold as possible to make the insulator base as short as possible. The insulator base extends from the combustion chamber-side end of the insulator to the insulator seat with which the insulator rests on the housing. It has proven to be advantageous that the insulator base has a length that is not longer than 7 mm, in particular not longer than 4 mm. The length of the insulator base is measured parallel to the longitudinal axis of the spark plug.

The shorter the insulator base, the less it projects into the breathing space of the spark plug. The breathing space of the spark plug is filled with the gas mixture present in the combustion chamber. The less the insulator base projects into the breathing space, the less contact surface the insulator base has with the hot gas mixture and the less heat it can absorb from the gas mixture.

In a further advantageous embodiment of the present invention, the center electrode projects out of the insulator. The center electrode has a projection length that is measured from the combustion chamber-side end surface of the insulator to a combustion chamber-side end of the center electrode. The projection length of the center electrode is not greater than 6.0 mm, in particular not greater than 4.0 mm, and in particular not less than 0.5 mm, preferably not less than 1.1 mm.

Limiting the projection length to a maximum length of 6.0 mm has the advantage that the center electrode does not project too far into the breathing space and therefore cannot absorb as much heat from the gas mixture in the breathing space, so that the spark plug has a low heat value. The advantage of the minimum length of the projection length is that, with a minimum length of 0.5 mm, the spacing to the combustion chamber-side end surface of the insulator is large enough to exclude creeping sparks along the insulator when the ground electrodes are adjusted laterally radially relative to the center electrode.

According to an example embodiment of the present invention, the spark plug comprises a breathing space which extends inside the housing from the combustion chamber-side end face of the housing to the insulator base groove, wherein the center electrode and the insulator base are disposed inside the breathing space and the at least one ground electrode is disposed at least partly, in particular completely, inside the breathing space. The breathing space is in particular in contact with a combustion chamber in the plane subtended by the housing end face perpendicular to the longitudinal axis of the spark plug when the spark plug is installed in a combustion engine. It is advantageously provided that the breathing space has a volume of not greater than 500 $mm^3$, in particular not greater than 300 $mm^3$, and in particular not less than 50 $mm^3$. The volume of the electrodes and the insulator is not included when calculating the volume.

Limiting the volume of the breathing space has the advantage that the breathing space is not too large and can therefore easily be flushed with a fresh gas mixture, so that not too much gas mixture consumed by the ignition accumulates in the breathing space. On the one hand, this avoids the deposition of particulate matter produced during combustion, such as soot, and, on the other hand, a fresh gas mixture has a lower temperature than a consumed gas mixture, which reduces the heat input into the spark plug via the breathing space.

In an advantageous further development of the present invention, it is provided that the spark plug comprises at least two ground electrodes which each form a spark gap with the center electrode, wherein the plurality of ground electrodes are disposed the same or differently relative to the center electrode, i.e. the spark gaps can be the same or different, but preferably all of the spark gaps ensure the advantageous features listed here, such as position in relation to the combustion chamber-side end face of the housing and electrode spacing.

Since the spark plug comprises a plurality of ground electrodes, the wear on the ignition surface can be distributed over a plurality of ground electrodes and the ignition surface of the individual ground electrode does not require as much volume of a wear-resistant material as it does for a single ground electrode. The service life of the spark plug is increased.

In a particularly advantageous embodiment of the present invention, the at least two ground electrodes are disposed symmetrically on the inside of the housing. The longitudinal axis of the spark plug is the axis of symmetry for the arrangement of the ground electrodes. The symmetrical arrangement of the ground electrodes results in the technical effect that the flow of the fuel/air mixture within the breathing space is very uniform, which further promotes good ignition and good ignition stability of the fuel/air mixture in the spark plug.

In an alternative embodiment of the present invention, the plurality of ground electrodes can also be disposed asymmetrically on the inside of the housing. An asymmetrical arrangement of the plurality of ground electrodes in the spark plug is advantageous when the spark plug is disposed in the cylinder decentrally to the cylinder axis, for example.

The at least one ground electrode and/or the center electrode advantageously each comprise an ignition element that is made of a different material than the rest of the electrode that forms the spark gap with the opposite electrode, for instance, and the ignition element(s) consist of a noble metal or a noble metal alloy, in particular Pt, Ir, Rh, Pd, Re, Au or an alloy thereof. An alloy with a high Ir content, i.e. Ir is the element with the highest individual content in the alloy, is particularly advantageous here. These elements or the alloy comprising these elements are particularly wear-resistant.

Advantageously, the ignition element for the ground electrode and/or the center electrode has rounded or beveled edges. The rounding radius r for an ignition element with rounded edges is $d/10 \leq r \leq d/2$, wherein d is the cylinder diameter of the ignition element. In the ignition element with beveled edges, the bevel has a width b and a height h, wherein $d/10 \leq b \leq d/2$ and/or $d/10 \leq h \leq d/2$ with the cylinder diameter d of the ignition element.

The spark plug according to the present invention and its further development is a hydrogen spark plug, for example, which is configured to be used in an engine operated with hydrogen-containing fuel and ignite the ignitable hydrogen-containing fuel/air mixture. The fuel can contain up to 100% hydrogen, i.e. the fuel can be only hydrogen or a hydrogen-gas mixture.

However, the spark plug according to the present invention is not limited to operation with hydrogen. The spark plug according to the present invention can also be used for natural gas or gasoline combustion engines.

DETAILED DESCRIPTION OF EXAMPLE EMBODIMENTS

Figure 1:
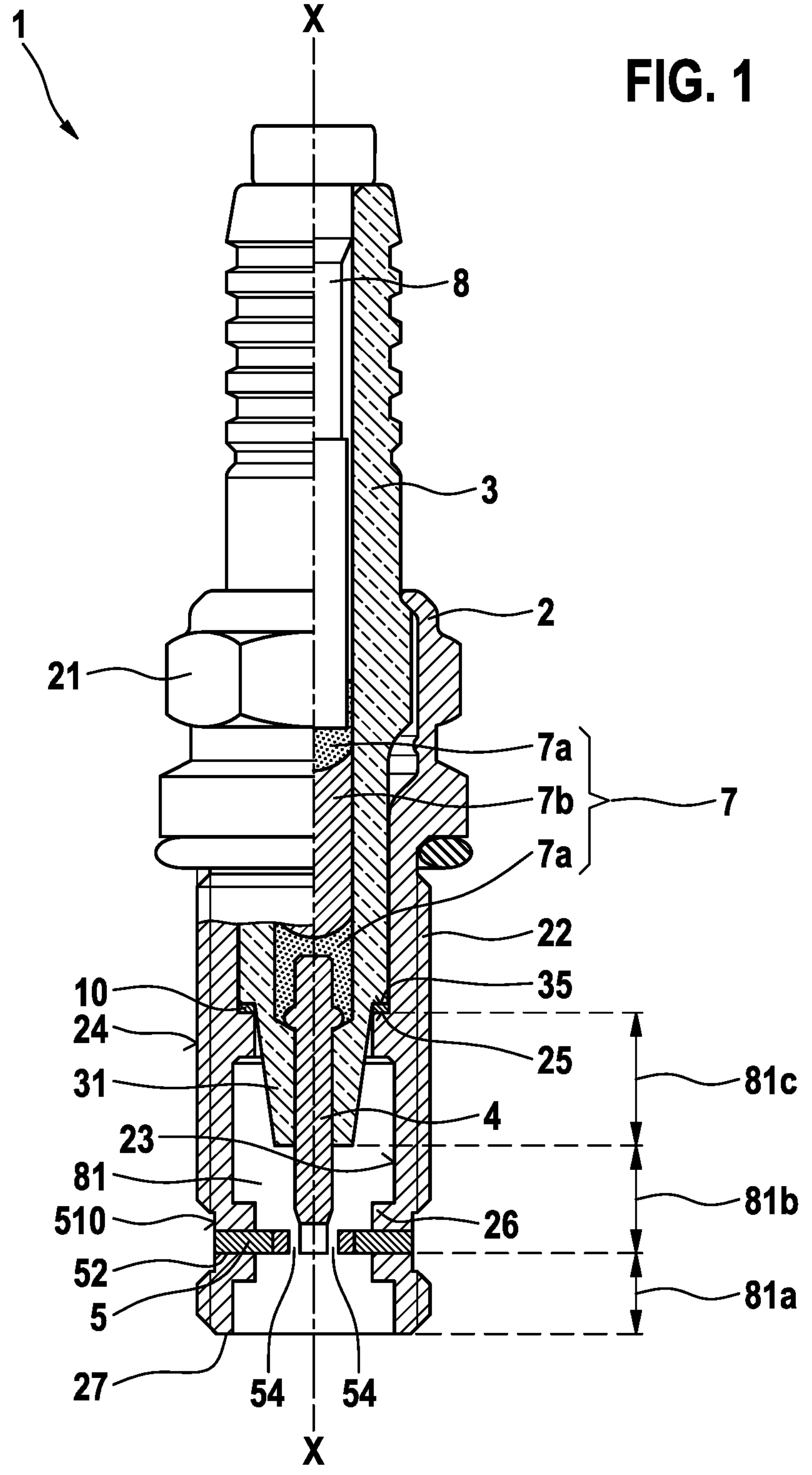
FIG. 1 shows a spark plug according to an example embodiment of the present invention.

FIG. 1 shows a spark plug 1 in a half-sectional view. The spark plug 1 comprises a housing 2. An insulator 3 is inserted into the housing 2. The housing 2 and the insulator 3 each have a bore along their longitudinal axis. The housing 2 has an outer side 24 and an inner side 23. The longitudinal axis of the housing 2, the longitudinal axis of the insulator 3 and the longitudinal axis x of the spark plug 1 coincide. A center electrode 4 is inserted into the insulator 3. A connecting bolt 8 for bringing the spark plug into electrical contact furthermore extends into the insulator 3 and brings the spark plug 1 into electrical contact with a voltage source. The electrical contact-connection forms the end of the spark plug 1 facing away from the combustion chamber. The electrical contact-connection can be configured in one piece, as in this example, or made of several components.

The insulator 3 is typically divided into three regions: insulator base 31, insulator body and the insulator head. The three regions differ in their different diameters, for example. The insulator base 31 is the end of the insulator 3 facing the combustion chamber. The center electrode 4 is disposed inside the insulator base 31. The insulator base 31 is disposed completely inside the housing 2 here. The insulator base 31 typically has the smallest outer diameter on the insulator 3. The insulator base has a length of at most 7 mm.

The insulator body, which is typically completely enclosed by the housing 2, is disposed adjacent to the insulator base 31. The insulator body has a larger outer diameter than the insulator base 31. The transition between the insulator base 31 and the insulator body is configured as a shoulder, the so-called insulator seat 35. The transition between the insulator seat 35 and the insulator base 31 is referred to as the insulator base groove.

The insulator head adjoins the end of the insulator body facing away from the combustion chamber and forms the end of the insulator 3 facing away from the combustion chamber. The insulator head projects out of the housing 2. The outer diameter of the insulator head lies between the outer diameters of the insulator base 31 and the insulator body, wherein the regions typically do not have a constant outer diameter over their length; the outer diameter can instead vary.

The housing 2 comprises a seat 25 on its inner side. The insulator rests with its shoulder or insulator seat 35 on the housing seat 25. An inner seal 10 is disposed between the insulator seat 35 and the housing seat 25.

A resistance element 7 is disposed in the insulator 3 between the center electrode 4 and the connecting bolt 8 for bringing the spark plug into electrical contact. The resistance element 7 connects the center electrode 4 to the connecting bolt 8 in an electrically conductive manner. The resistance element 7 is structured as a layer system consisting of a first contact layer **7*a*, a resistance layer 7*b* and a second contact layer 7*a*, for example. The layers of the resistance element differ by their material composition and the resulting electrical resistance. The first contact layer 7*a* and the second contact layer 7*a*** can have a different or the same electrical resistance.

In this example, two ground electrodes 5 are disposed in a respective bore 52 on the inner side 23 of the housing 2, so that the ground electrodes 5 project radially from the inner side 23 of the housing into the bore along the longitudinal axis X of the housing 2. The ground electrodes 5 and the center electrode 4 together form a respective spark gap 54. The respective spark gap between the center electrode and the respective ground electrode extends radially to the longitudinal axis x. The width of the respective spark gap 54 is the electrode spacing and is in the range of 0.05 mm to 0.3 mm. The bores 52 extend from the outer side 24 through the housing wall to the inner side 23 of the housing 2.

The spark plug 1 can alternatively also comprise more than just one or more than two ground electrodes 5.

In this example according to FIG. 1, there is a respective spark gap 54 between the center electrode 4 and the two ground electrodes 5. The projection of the ignition element 41 of the center electrode 4 completely covers the ignition surface of the respective ground electrode 5 in axial direction, and in particular also in the direction perpendicular to the spark plug longitudinal axis. The combustion chamber-side end of the spark gap lies in a plane perpendicular to the longitudinal axis x with the combustion chamber-side end of the ignition surface of the ground electrode 5. The spacing **81*a* between the spark gap and the plane subtended by the combustion chamber-side end face 27 of the housing 2** perpendicular to the longitudinal axis x here is greater than 0 and equal to or less than −15 mm.

The center electrode 4 projects out of the insulator base 31 and has a projection length **81*b*** of at least 0.5 mm to at most 6.0 mm.

The housing 2 comprises a shaft. A polygon 21, a shrink groove and a thread 22 are formed on this shaft. The thread 22 is used to screw the spark plug 1 into an engine.

The bores 52 in the housing wall are formed in the region of the thread 22. The bore 52 for the ground electrodes 5, and thus also the ground electrodes 5, can be disposed at any height in the region of the thread 22. Depending on the position of the ground electrodes 5 in the region of the thread 22, the center electrode 4, and with it also the insulator base 31, projects more or less far into the breathing space 81. The position of the bores in the region of the thread 22 and the ground electrodes 5 on the inner side 23 of the housing 2 can be selected depending on the desired intended use of the spark plug 1.

The bores 52 are each disposed in a recess 510, such as a conical or round groove, for instance. The outer diameter of the housing 2 in the recesses is smaller than the core diameter of the thread 22.

The recesses 510 can be created by punching the housing 2 during the production of the spark plug 1, for example. This not only reduces the outer diameter of the housing 2 in the region of the recesses 510, but also the inner diameter of the housing 2 in the region of the recesses 510, so that a projection 26 is created inside the housing for each recess 510.

Inside the housing 2 there is a breathing space 81 with a volume. The breathing space 81 extends from the combustion chamber-side end face 27 of the housing into the housing 2 and inside the housing 2 to the insulator base groove, which adjoins the insulator seat 35 that is resting on the housing seat 25.

The intermediate space between the housing 2 and the insulator 3 is sealed in a gas-tight manner at this location by means of an inner seal 10. The volume of the ground electrodes 5, the center electrode 4 and the insulator base 31 are subtracted when calculating the volume of the breathing space. The volume of the breathing space 81 is at most 500 $mm^3$.

The housing 2 or the bores 52 for the ground electrodes 5 can have grooves or furrows from production, which results in a surface roughness. The grooves and furrows are created when the bores on or in the housing 2 are machined with a turning process in which material is removed from the housing 2, for instance.

Figure 2:
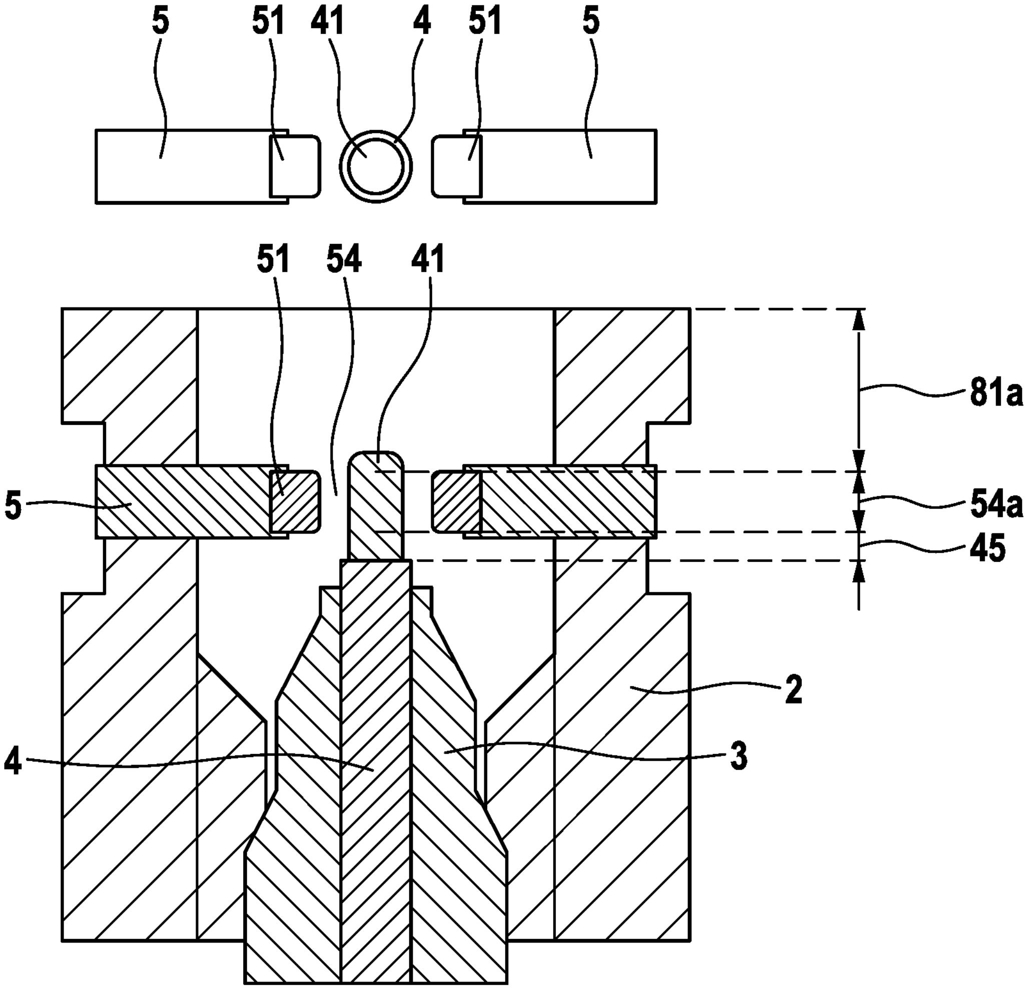
FIG. 2 shows a first example for the electrodes of the spark plug according to an example embodiment of the present invention.

FIG. 2 shows a first example for the arrangement of the electrodes 4, 5 of the spark plug 1 according to the present invention. The upper half shows a plan view onto the electrodes from the direction of a combustion chamber and the lower half shows a sectional side view of the electrode arrangement.

The center electrode 4 comprises an electrode body and an ignition element 41 at its combustion chamber-side end. The ignition element 41 is connected to the electrode body by means of a material-locking connection, such as welding, for example. The ignition element 41 is cylindrical with a round base. The ignition element 41 has a longitudinal axis perpendicular to its round bases, wherein the longitudinal axis extends parallel to the longitudinal axis x of the spark plug 1.

In this example, two ground electrodes 5 are shown. However, there can also be more or fewer. For the sake of simplicity, the description of the figure in the following refers to one ground electrode. The statements apply to both ground electrodes.

The ground electrode 5 is disposed inside the housing on the housing 2 and forms a side electrode in relation to the center electrode 4. This accordingly creates a radial spark gap 54. The spark gap 54 is delimited by the ignition element 41 of the center electrode 4 and the ignition surface of the ground electrode 5. In this example, the ground electrode 5 also comprises an ignition element 51 that forms the ignition surface. The ignition element 51 of the ground electrode 5 has a flat surface in the direction of the center electrode 4 and therefore a flat ignition surface. The electrode spacing here is the smallest spacing between the ignition surfaces of the two electrodes 4, 5. The projection 54*a* of the ignition surface of the ground electrode 5 fits on the ignition element 41 of the center electrode 4 in axial direction and in the direction perpendicular to the spark plug longitudinal axis x. In other words, the projection of the center electrode ignition element 41 completely covers the ignition surface of the ground electrode 5 in axial direction and in perpendicular direction. The end of the projection 54*a* of the ground electrode ignition surface facing away from the combustion chamber has a spacing 45 from the electrode body of the center electrode 4 or the connection region between the electrode body and the ignition element 41 of the center electrode 4.

Figure 3:
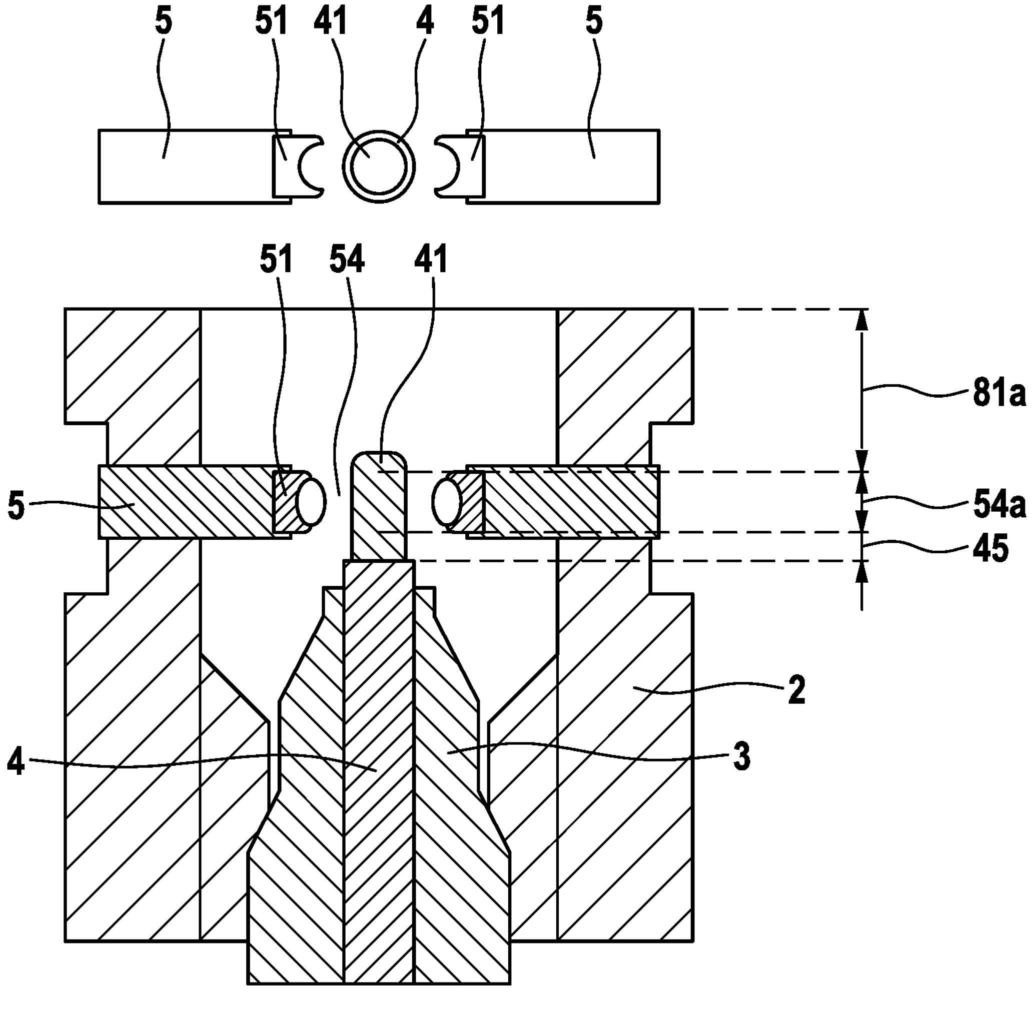
FIG. 3 shows a second example for the electrodes of the spark plug according to an example embodiment of the present invention.

FIG. 3 shows a second example of the arrangement of the electrodes 4, 5 of the spark plug 1 according to the present invention. The upper half shows a plan view onto the electrodes 4, 5 from the direction of a combustion chamber and the lower half shows a sectional side view of the electrode arrangement.

This example differs from the first example in FIG. 2 only in the design of the ignition element 51 of the ground electrode 5.

This can be seen particularly well in the plan view. The ignition element 51 of the ground electrode 5 does not have a flat surface, but rather a concave surface. The contour of the concave surface is shaped complementarily to the center electrode ignition element 41. The electrode spacing is consequently constant in axial direction and in the direction perpendicular to the longitudinal axis of the spark plug and the electrodes 4, 5 are therefore worn evenly.

The invention claimed is:

1. A spark plug with a longitudinal axis x, comprising:

a housing having an end face on a combustion chamber side;

an insulator which is disposed at least partly inside the housing;

a center electrode which is disposed at least partly inside the insulator and has an electrode body and an ignition element that is disposed on an combustion chamber-side end of the electrode body and serves as an ignition surface, wherein the ignition element has a cylindrical shape with a round base and a longitudinal axis which extends parallel to the spark plug longitudinal axis; and at least one ground electrode having an ignition surface, which is disposed inside the housing on the housing;

wherein the at least one ground electrode and the center electrode are disposed such that the at least one ground electrode and the center electrode form a spark gap that extends radially with respect to the spark plug longitudinal axis;

wherein a width of the spark gap is given by an electrode spacing between the center electrode and the at least one ground electrode;

wherein the electrode spacing between the center electrode and the at least one ground electrode is not greater than 0.3 mm, and the spark gap is completely inside the housing; and a projection of the ignition surface of the at least one ground electrode fits completely onto the ignition element of the center electrode in an axial direction, wherein an end of the projection of the ignition surface of the at least one ground electrode facing away from the combustion chamber on the ignition element of the center electrode is spaced apart in axial direction from an end of the ignition element of the center electrode facing away from the combustion chamber, a spacing between the projection and the end of the ignition element being at least 5% of a length of the ignition element.

2. The spark plug according to claim 1, wherein the projection of the ignition surface of the at least one ground electrode fits completely onto the ignition element of the center electrode in a direction perpendicular to the spark plug longitudinal axis.

3. The spark plug according to claim 1, wherein the ignition surface of the at least one ground electrode facing the center electrode is a flat surface.

4. The spark plug according to claim 1, wherein the ignition surface of the at least one ground electrode facing the center electrode is concave, and has a contour which is shaped complementarily to the center electrode ignition element.

5. The spark plug according to claim 1, wherein the electrode spacing is not greater than 0.2 mm and/or the electrode spacing is at least 0.05 mm and not less than 0.1 mm.

6. The spark plug according to claim 1, wherein a spacing between the spark gap and the combustion chamber-side end face of the housing is greater than 0 mm and at most −15 mm, wherein a plane subtended by the combustion chamber-side end face of the housing perpendicular to the longitudinal axis of the spark plug is a reference plane with a value 0 mm and a spacing from the reference plane in a direction of an end of the spark plug facing away from the combustion chamber takes on an increasingly negative value.

7. The spark plug according to claim 1, wherein the spark plug includes at least two ground electrodes which each form a spark gap with the center electrode, wherein the ground electrodes are disposed symmetrically around the center electrode.

8. The spark plug according to claim 1, wherein the at least one ground electrode and/or the center electrode each include an ignition element that forms the spark gap with an opposite electrode or with an ignition element of the opposite electrode, and each ignition element include a noble metal or a noble metal alloy, including: (i) Pt or Ir or Rh or Pd or Re or Au, or (ii) an alloy of Pt or Ir or Rh or Pd or Re or Au.

9. The spark plug according to claim 1, wherein the at least one ground electrode and/or the center electrode each include an ignition element, wherein each ignition element has rounded or beveled edges.

10. The spark plug according to claim 1, wherein the spark plug is a hydrogen spark plug which is configured to be used in a hydrogen-powered engine and ignite an ignitable hydrogen-containing fuel/air mixture.

* * * * *